United States Patent

Boinowitz et al.

[11] Patent Number: 5,990,187
[45] Date of Patent: Nov. 23, 1999

[54] METHOD OF PREPARING POLYURETHANE FOAM UTILIZING ORGANOFUNCTIONALLY MODIFIED POLYSILOXANES

[75] Inventors: Tammo Boinowitz; Georg Burkhart, both of Essen; Rolf-Dieter Langenhagen, Hattingen; Ingo Schlachter; Andreas Weier, both of Essen, all of Germany

[73] Assignee: Th. Goldschmidt AG, Essen, Germany

[21] Appl. No.: 08/870,189

[22] Filed: Jun. 6, 1997

[30] Foreign Application Priority Data

Mar. 26, 1997 [DE] Germany .......................... 197 12 628

[51] Int. Cl.⁶ ....................................................... C08J 9/04
[52] U.S. Cl. ......................... 521/170; 521/122; 521/155; 521/172; 521/174
[58] Field of Search ..................................... 521/122, 155, 521/170, 172, 174

[56] References Cited

U.S. PATENT DOCUMENTS 2,834,748  5/1958  Bailey et al. .
3,629,308  12/1971  Bailey et al. .
5,357,018  10/1994  Burkhart et al. .......................... 528/15
5,688,860  11/1997  Croft ....................................... 521/122
5,744,507  4/1998  Angell et al. .......................... 521/122

Primary Examiner—John M. Cooney, Jr.
Attorney, Agent, or Firm—Frommer Lawrence & Haug LLP

[57] ABSTRACT

The invention relates to the use of polysiloxane-polyoxyalkylene copolymers of the general formula I

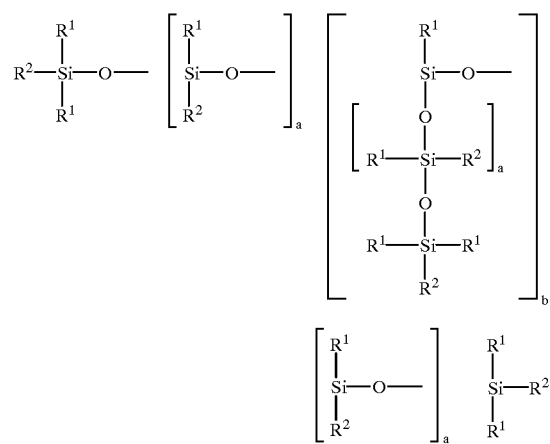

as additives in the production of polyurethane foams.

4 Claims, No Drawings

METHOD OF PREPARING POLYURETHANE FOAM UTILIZING ORGANOFUNCTIONALLY MODIFIED POLYSILOXANES

The invention relates to the use of polysiloxane-polyoxyalkylene copolymers containing modified polyoxyalkylene building blocks as additives in the production of polyurethane foams.

Polysiloxane-polyoxyalkylene block copolymers are used in the production of polyurethane foams. They make possible the formation of a uniform pore structure and stabilize the foam during the production process.

Not all polysiloxane-polyoxyalkylene block copolymers can be used for this application. The usability is influenced by an equilibrium of the polysiloxane blocks and the polyoxyalkylene blocks in the copolymer which has to be set precisely. The buildup of the two blocks is thus of great importance. The structures of the blocks can be varied by means of many parameters.

The composition of the polyoxyalkylene block can be altered in terms of the oxyalkylene units present; particular examples are oxyethylene, oxypropylene and oxybutylene. In this context, the composition means not only the relative number but also the arrangement of the oxyalkylene units. Furthermore, the molecular weight and the end group of the polyoxyalkylene block can be varied. The polyoxyalkylene block can be linked to the polysiloxane via a hydrolysis-stable Si—C bond or a less hydrolysis-stable Si—O—C bond.

The polysiloxane can be altered in terms of the number of siloxane units, the branching and the number of linkage possibilities with the polyoxyalkylene.

The effectiveness of a polysiloxane-polyoxyalkylene copolymer for foam stabilization can only be predicted to a very limited extent. The expertise in this field is therefore the empirical study of the effects of the possible structural changes.

Polysiloxane-polyoxyalkylene block copolymers have been described in numerous publications. The following citations therefore represent only a selection.

DE-A-15 70 647 is concerned with the Si—O—C linkage of chloropolysiloxanes to polyoxyalkylene units of which from 40 to 70% have molecular weights of from 1000 to 3000, preferably having secondary OH groups, and up to 50 OH equivalent per cent have a molecular weight of from 130 to 3500, and which are built up of ethylene oxide and/or propylene oxide. Preference is given to a molecular weight of up to 1750.

DE-A-16 94 366: Use of polysiloxane-polyoxyalkylene copolymers having the following buildup as foam stabilizers: from 25 to 70% of the weight consist of a polyoxyalkylene having a mean molecular weight of from 1600 to 4000 and an ethylene oxide content of from 20 to 100% by weight (the other monomer is, if present, propylene oxide or possibly higher alkylene oxide) and from 30 to 75% by weight of a polyoxyalkylene having a mean molecular weight of from 400 to 1200 and an ethylene oxide content of from 65 to 100% by weight (the other monomer is, if present, propylene oxide or possibly higher alkylene oxide).

EP-A-0 275 563: The block copolymer described here is built up of three different polyoxyalkylene units. One block contains from 20 to 60% by weight of oxyethylene units and has a molecular weight of from 3000 to 5500, a further block contains from 20 to 60% by weight of oxyethylene units and has a molecular weight of from 800 to 2900 and a third block consists of only polyoxypropylene and has a molecular weight of from 130 to 1200.

The present invention relates to the use of improved polysiloxane-polyoxyalkylene block copolymers as additives in the production of polyurethane foams. The optimization comprises a modification of the polyoxyalkylene building blocks. The use of the additive composition of the invention allows the properties of the polyurethane foams produced using these substances to be adjusted very finely.

The present invention accordingly provides for the use of organofunctionally modified polysiloxanes of the general formula I

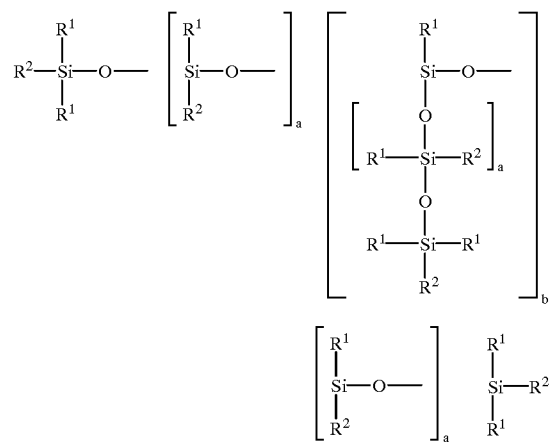

as additives in polyurethane foam production, where the radicals $R^1$ are alkyl radicals having from 1 to 4 carbon atoms or aryl radicals, but with at least 80% of the radicals $R^1$ being methyl radicals, $R^2$ are $R^1$ and/or $R^3$ and/or $R^4$, with the proviso that at least one radical $R^3$ is present per silicone-polyether copolymer molecule, $R^3$ is a polyether radical of the formula II

with the proviso that
e=0 or 1,
w=1 to 4,
d=1 to 3,
m≧1,
x=2 to 4 and
p≧1, and,
Y is a (w+1)-valent hydrocarbon radical which may also be branched,
R' is selected from the group consisting of monovalent, aliphatic or aromatic hydrocarbons from $C_1$ to $C_{18}$, with the proviso that different radicals can also be combined with one another but at least one radical R' per silicone-polyether copolymer molecule is an unsubstituted or substituted aromatic radical,
Z is hydrogen or a monovalent organic radical,
the sum m+p=3 to 100,
$R^4$ is a polyether radical of the formula III

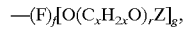

with the proviso that
f=0 or 1,
x=2 to 4,
g=1 to 4 and
r≧1,

F is a (g+1)-valent hydrocarbon radical which may also be branched, a is from 1 to 100 when b is from 6 to 8, a is from 1 to 200 when b is from 3 to 6, a is from 1 to 300 when b is from 0 to 3, b=0 to 8.

The siloxane framework can be linear (b=0) or branched (>0 to 8). According to experience, the value of a can only be combined in the manner indicated with values of b, since otherwise the increased viscosity of the polymer molecules leads to gelling and makes handling impossible. The compounds of the invention are therefore processable at room temperature. The value of b as well as the value of a are, as those skilled in the art know, average values in the polymer molecule since the polysiloxanes to be used according to the invention are, as a rule, in the form of equilibrated mixtures.

The radicals $R^1$ are alkyl radicals having from 1 to 4 carbon atoms, for example methyl, ethyl, propyl or butyl radicals, or aryl radicals, preferably phenyl radicals. For reasons of the preparation and price, preference is given to methyl radicals so that at least 80% of the radicals $R^1$ have to be methyl radicals. Particular preference is given to those polysiloxanes in which all radicals $R^1$ are methyl radicals.

The essence of the present invention comprises, in particular, the use of organofunctionally modified polysiloxanes which comprise a particular combination of polyethers, with the radical R' of $R^3$ preferably being a phenyl radical, possibly a substituted aromatic. Targeted selection of such abovementioned polyether radicals, which can also be combined with polyether radicals as are defined as radical $R^4$, enables a balance of the organic radicals to be set in very fine steps. As shown by the following examples, which serve only for illustration but do not constitute any form of restriction, the effects of the additive are, for example in the production of flexible polyurethane foams, the avoidance of collapse and the optimization of achieving low bulk densities. Furthermore, the modified polysiloxanes used according to the invention are able to effect improvements in other polyurethane foam formulations. Thus, for example, the cell fineness in rigid foam is significantly increased.

As is known to those skilled in the art, both the average molecular weights of the siloxane chains and also the polyether used are strongly dependent on the type of foam to be stabilized. For flexible foam, for example, regardless of whether with (see EP-A-0 645 226) or without use of gases under pressure as blowing agents, siloxane chain lengths between 40 and 200 and quite long-chain polyethers (MW up to 4000 g/mol) have been found to be favorable. The rigid foam application requires shorter siloxane chains (<50 $SiR_2O$ units) and polyether chains (<1500 g/mol). Such different stabilizer molecular weights do not allow any general statement as to the minimum effective aromatic content. Accordingly, while in rigid foam with small molecules a modification using only 1 mol of styrene oxide per mole of stabilizer gives significant improvements, the effectiveness limit in the case of flexible foam begins only at higher contents of aromatic groups in the polyether.

The polyethers described as $R^3$ and $R^4$ are obtained by adding monomers onto an initiator alcohol, preferably allyl alcohol. Suitable monomers in $R^4$ having the formula —(F)$_f$[O(C$_x$H$_{2x}$O)$_r$Z]$_g$, with the proviso that f=0 or 1, x=2 to 4, g=1 to 4 and r≧1, are, for example, ethylene oxide, propylene oxide, tetrahydrofuran, butylene oxide, and isobutylene oxide, and for the aromatic-containing polyether components of $R^3$ these monomers plus, for example, styrene oxide and α-methylstyrene oxide.

$R^3$ is a polyether having the formula
—(Y)$_e$[O(C$_2$H$_{4-d}$R'$_d$O)$_m$(C$_x$H$_{2x}$O)$_p$Z]$_w$ with the proviso that e=0 or 1, w=1 to 4, d=1 to 3, m≧1, x=2 to 4 and p≧1.

For these polyether radicals, the composition of the monomers can be selected in any fashion, so that, for example, styrene oxide, ethylene oxide and propylene oxide blocks can be present. In addition, a mixture of the monomers can also be used, giving polyethers in which the units are randomly distributed. The indices m, p and r are numbers to be selected independently of one another. Z in the two radicals $R^3$ and $R^4$ are each, independently of one another, a hydrogen atom or a monovalent organic radical, preferably an acetyl or a methyl radical. In the radical $R^4$, the index r preferably has a numerical value of from 8 to 100. In the radical $R^3$, the index m preferably has a numerical value of from 1 to 100, particularly preferably from 5 to 50, and the index p preferably has a numerical value of from 1 to 100, particularly preferably from 5 to 50. These indices are average numbers since it is known that the addition of epoxides to alcohols gives a mixture of compounds having different chain lengths.

The radicals $R^3$ and $R^4$ can be bound to a polysiloxane by means of two different types of chemical reaction. Hydrolysis of chlorosiloxanes with polyethers to eliminate hydrogen chloride forms an SiOC bond. The preparation of these compounds can be taken from DE-C-10 12 602, DE-C-10 40 251 and DE-C-11 20 147 and also U.S. Pat. No. 3,115,512. The second possibility is the hydrosilylation reaction in which the radicals $R^3$ and $R^4$ are introduced into the molecule of the polysiloxane with formation of an SiC bond by addition onto SiH groups of the polysiloxane in the presence of a hydrosilylation catalyst. According to the prior art, catalysts used for the latter possibility are platinum catalysts such as cis-dichlorodiammineplatinum(II) or hexachloroplatinic(IV) acid. The latter possibility is described, for example in U.S. Pat. No. 2,846,458 and also in DE-A-12 20 615 and DE-A-11 53 166.

EXAMPLE 1

A glass flask fitted with stirrer, thermometer, gas inlet and heating mantle is charged with the following three polyethers and 450 g of toluene:

a) 128 g of a polyether having an average molecular weight of 1500 g/mol, an oxyethylene content of 15%, an oxypropylene content of 45% and an oxyphenylethylene content of 40%. One OH function is etherified with allyl alcohol.

b) 190 g of a polyether having an average molecular weight of 3800 g/mol, an oxyethylene content of 40% and an oxypropylene content of 60%. One OH function is etherified with allyl alcohol, the other is etherified with methanol.

c) 21 g of a polyether having an average molecular weight of 1400 g/mol, an oxyethylene content of 40% and an oxypropylene content of 60%. One OH function is etherified with allyl alcohol, the other is etherified with methanol.

The residual OH number of the polyether b) and c) is 9 mg KOH/g.

During an azeotropic water distillation, 150 ml of the toluene are distilled off under a blanket of nitrogen. The flask is then fitted with a reflux condenser and a dropping funnel. At a temperature of 105° C., 0.2 g of a 10% strength solution of $H_2PtCl_6 \cdot 6H_2O$ in iso-propanol are added dropwise and the mixture is stirred for 5 minutes. 80.4 g (=0.1 mol of SiH) of a siloxane having the following average composition

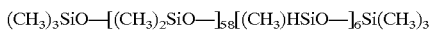

are then added dropwise over a period of 20 minutes. After 4 hours, the SiH conversion is 98% (determination of the hydrogen liberated in n-butanol under alkaline conditions). The product is stirred with 2 g of bentonite for 30 minutes and is then filtered. After distilling off the remaining toluene at 80° C. under reduced pressure (20 mbar), a clear yellowish product is obtained.

EXAMPLE 2

A glass flask fitted with stirrer, thermometer, gas inlet and heating mantle is charged with the following three polyethers and 450 g of toluene:
  a) 127 g of a polyether having an average molecular weight of 1500 g/mol, an oxyethylene content of 35%, an oxypropylene content of 50% and an oxyphenylethylene content of 15%. One OH function is etherified with allyl alcohol.
  b) 190 g of a polyether having an average molecular weight of 3800 g/mol, an oxyethylene content of 40% and an oxypropylene content of 60%. One OH function is etherified with allyl alcohol, the other is etherified with methanol.
  c) 21 g of a polyether having an average molecular weight of 1400 g/mol, an oxyethylene content of 40% and an oxypropylene content of 60%. One OH function is etherified with allyl alcohol, the other is etherified with methanol.

The residual OH number of the polyether b) and c) is 9 mg KOH/g.

During an azeotropic water distillation, 150 ml of the toluene are distilled off under a blanket of nitrogen. The flask is then fitted with a reflux condenser and a dropping funnel. At a temperature of 105° C., 0.2 g of a 10% strength solution of $H_2PtCl_6.6H_2O$ in iso-propanol are added dropwise and the mixture is stirred for 5 minutes. 80.4 g (=0.1 mol of SiH) of a siloxane having the following average composition

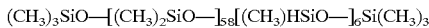

are then added dropwise over a period of 20 minutes. After 4 hours, the SiH conversion is 98% (determination of the hydrogen liberated in n-butanol under alkaline conditions). The product is stirred with 2 g of bentonite for 30 minutes and is then filtered. After distilling off the remaining toluene at 80° C. under reduced pressure (20 mbar), a clear yellowish product is obtained.

EXAMPLE 3

A glass flask fitted with stirrer, thermometer, gas inlet and heating mantle is charged with the following two polyethers and 450 g of toluene:
  a) 153 g of a polyether having an average molecular weight of 1500 g/mol, an oxyethylene content of 70%, and an oxyphenylethylene content of 30%. One OH function is etherified with allyl alcohol, the other is etherified with methanol.
  b) 332 g of a polyether having an average molecular weight of 3800 g/mol, an oxyethylene content of 40% and an oxypropylene content of 60%. One OH function is etherified with allyl alcohol, the other is etherified with methanol.

During an azeotropic water distillation, 150 ml of the toluene are distilled off under a blanket of nitrogen. The flask is then fitted with a reflux condenser and a dropping funnel. At a temperature of 105° C., 0.2 g of a 10% strength solution of $H_2PtCl_6.6H_2O$ in iso-propanol are added dropwise and the mixture is stirred for 5 minutes. 80.4 g (=0.1 mol of SiH) of a siloxane having the following average composition

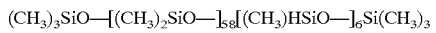

are then added dropwise over a period of 20 minutes. After 4 hours, the SiH conversion is 98% (determination of the hydrogen liberated in n-butanol under alkaline conditions). The product is stirred with 2 g of bentonite for 30 minutes and is then filtered. After distilling off the remaining toluene at 80° C. under reduced pressure (20 mbar), a clear yellowish product is obtained.

EXAMPLE 4

(Comparative Example)

A glass flask fitted with stirrer, thermometer, gas inlet and heating mantle is charged with the following two polyethers and 450 g of toluene:
  a) 128 g of a polyether having an average molecular weight of 1400 g/mol, an oxyethylene content of 20%, and an oxypropylene content of 80%. One OH function is etherified with allyl alcohol, the other is etherified with methanol.
  b) 332 g of a polyether having an average molecular weight of 3800 g/mol, an oxyethylene content of 40% and an oxypropylene content of 60%. One OH function is etherified with allyl alcohol, the other is etherified with methanol.

During an azeotropic water distillation, 150 ml of the toluene are distilled off under a blanket of nitrogen. The flask is then fitted with a reflux condenser and a dropping funnel. At a temperature of 105° C., 0.2 g of a 10% strength solution of $H_2PtCl_6.6H_2O$ in iso-propanol are added dropwise and the mixture is stirred for 5 minutes. 80.4 g (=0.1 mol of SiH) of a siloxane having the following average composition

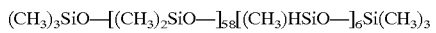

are then added dropwise over a period of 20 minutes. After 4 hours, the SiH conversion is 98% (determination of the hydrogen liberated in n-butanol under alkaline conditions). The product is stirred with 2 g of bentonite for 30 minutes and is then filtered. After distilling off the remaining toluene at 80° C. under reduced pressure (20 mbar), a clear yellowish product is obtained.

EXAMPLE 5

(Comparative Example)

A glass flask fitted with stirrer, thermometer, gas inlet and heating mantle is charged with the following three polyethers and 450 g of toluene:
  a) 73.6 g of a polyether having an average molecular weight of 1400 g/mol, an oxyethylene content of 50%, an oxypropylene content of 50%. One OH function is etherified with allyl alcohol, the other is etherified with methanol.
  b) 201.2 g of a polyether having an average molecular weight of 4000 g/mol, an oxyethylene content of 50% and an oxypropylene content of 50%. One OH function is etherified with allyl alcohol, the other is etherified with methanol.
  c) 38.1 g of a polyether having an average molecular weight of 1500 g/mol, and an oxypropylene content of 100%. One OH function is etherified with allyl alcohol, the other is etherified with methanol.

During an azeotropic water distillation, 150 ml of the toluene are distilled off under a blanket of nitrogen. The flask is then fitted with a reflux condenser and a dropping funnel. At a temperature of 105° C., 0.2 g of a 10% strength solution of $H_2PtCl_6.6H_2O$ in iso-propanol are added dropwise and the mixture is stirred for 5 minutes. 87.7 g (=0.1 mol of SiH) of a siloxane having the following average composition

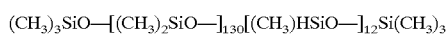

are then added dropwise over a period of 20 minutes. After 4 hours, the SiH conversion is 98% (determination of the hydrogen liberated in n-butanol under alkaline conditions). The product is stirred with 2 g of bentonite for 30 minutes and is then filtered. After distilling off the remaining toluene at 80° C. under reduced pressure (20 mbar), a clear yellowish product is obtained.

To assess the effectiveness of the additive, flexible and rigid polyurethane foams are produced.

In Comparisons 1 to 4, the effects of the organomodified polyether siloxanes claimed are first shown for flexible foams which are produced by the following procedure.

For the first two comparisons, 300 parts of a conventional, commercially available polyether for the production of flexible polyurethane foams, which polyether has an average of 3 OH groups and a molecular weight of 3500 g/mol, are mixed thoroughly with 12 parts of water, 9 parts of a physical blowing agent, the specified amount of foam stabilizer component to be tested, 0.33 parts of triethylenediamine and 0.6 part of tin octoate. After addition of 125 parts of tolylene diisocyanate (a 4:1 mixture of the 2,4 and 2,6 isomers), the mixture is intensively mixed with a stirrer at 3000 rpm for 7 seconds and poured into a box. The resulting foam is used for determining the following data. For Comparison 3, the proportions of water and of physical blowing agent are increased.

In the following, physical data for polyurethane foams which have been produced using the novel stabilizers from Example 1, 2, 3 and 70% strength mixtures of Example 2 with polyether or with a silicone-polyether copolymer (Example 5) are compared with foams which have been produced using the Example 4 which is not according to the invention or the stabilizer L 580 which is commercially available for the Asian market from OSi Specialties Inc.

If the bulk densities of the foams obtained using Example 1 are compared with those obtained using the commercial stabilizer L 580, the following data are obtained:

Comparison 1

| Ratio of the use concentration of the polyether siloxane | Foam density using Example 1 [kg/m³] | Foam density using commercial stabilizer L 580 [kg/m³] |
| --- | --- | --- |
| 1.8 | 21.40 | 22.10 |
| 1.3 | 21.55 | 22.15 |
| 1.0 | 21.55 | 22.55 |

The comparison clearly shows that the novel additive structures, in terms of their stabilizing action in the foam, make possible significantly higher volume yields, i.e. are more active, compared with the prior art (represented here by the commercial stabilizer L 580 from OSi Specialties Inc.).

In Comparison 2, the degree of settling is studied. Settling here means the distance the foam drops during production after the rise phase.

The siloxane-polyether copolymer of the invention (Example 2) is additionally tested in polyether-diluted form (70%). The diluent polyether has a molecular weight of 1000 g/mol and an oxypropylene content of 60%. One OH function is etherified by a butyl group.

Comparison 2

| Ratio of the use concentration of the polyether siloxane | Settling using Example 2 [cm] | settling using mixture of Example 2 (70%) in polyether (30%) [cm] | Settling using commercial stabilizer L 580 [cm] |
| --- | --- | --- | --- |
| 1.8 | 0 | 0 | 0.4 |
| 1.3 | 0 | 0.1 | 0.7 |
| 1.0 | 0 | 0.2 | 1.1 |

If Example 3 according to the invention is compared with Example 4 which is not according to the invention (Comparison 3), the structures of the polyether siloxanes differing only by the styrene oxide modification of the polyether, use of Example 3 together with 15 parts of water and 30 parts of a physical blowing agent in the abovementioned foam formulation gives a stable foam while the comparable mixture using Example 4 shows defoaming.

Comparison 3

| Ratio of the use concentration of the polyether siloxane | Foam density using Example 3 [kg/m³] | Foam density using Example 4 [kg/m³] |
| --- | --- | --- |
| 1.8 | 16.35 | Collapse/no stable foam |
| 1.3 | 17.95 | Collapse/no stable foam |
| 1.0 | 18.35 | Collapse/no stable foam |

Comparison 4 shows the effectiveness of the mixture of Example 2 according to the invention (70% by weight) with another siloxane-polyether copolymer which is not according to the invention (Example 5, 30% by weight).

Comparison 4

| Ratio of the use concentration of the polyether siloxane | Settling using Example 5 [cm] | Settling using mixture of Example 2 (70%) and Example 5 (30%) [cm] |
| --- | --- | --- |
| 1.8 | 0.6 | 0.2 |
| 1.3 | 0.8 | 0.3 |
| 1.0 | 2 | 0.5 |

In Comparison 5, Example 3 according to the invention is tested in comparison with Example 4 which is not according to the invention and the commercially available stabiliser TEGOSTAB® B 8870 in a rigid foam formulation. The latter is the lightweight foam formulation DCS 534.01. Foaming is carried out at an isocyanate index of 41 to give a foam density of about 12 kg/m³. The initiator molecules of the polyols are aliphatic in nature. The additive concentration is 1.5 parts per 100.

| Comparison 5 | | |
| --- | --- | --- |
| Additive used | Defects in the foam | Cells/cm |
| TEGOSTAB ® B 8870 | very few | 34 |
| Example 3 | none | 40 |
| Example 4 | few | 34 |

This comparison clearly shows that an aromatic modification of the polyether chain in the polyether siloxane increases the number of cells per cm in the resulting rigid foams. The commercial stabilizer and the unmodified structure are also inferior in respect of the occurrence of defects in the foam.

The results of these use tests clearly show that styrene oxide modification of the polyether which represents the raw material for the synthesis of the polyether siloxane enables fine adjustment of the stabilizing action of silicone-polyether copolymers according to the invention in polyurethane foaming.

It is thus possible to optimize each of the foams in respect of the relevant properties, in flexible foam for example in respect of foam density, degree of settling and avoidance of collapse, in rigid foam for example fineness of cells and occurrence of foam defects.

The improved effectiveness of the styrene oxide-modified silicone-polyether copolymers is also retained in mixtures with polyethers and silicone-polyether copolymers which do not have an aromatic radical.

We claim:

1. A method of finely adjusting pore structure of polyurethane foam while stabilizing said polyurethane foam in the production of polyurethane foams comprising adding an additive comprising at least one organo functionally modified polysiloxanes of formula I

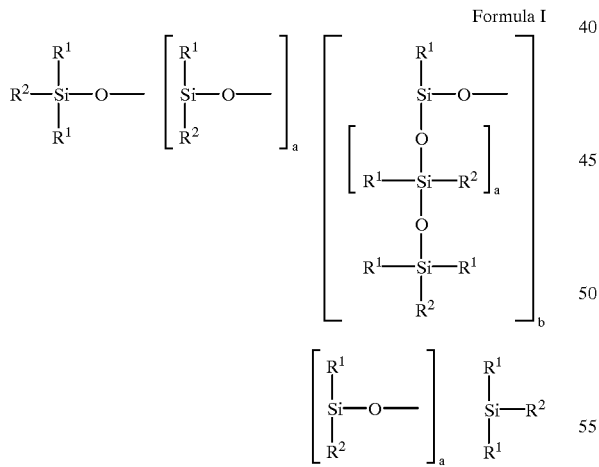

Formula I wherein the radicals $R^1$ are alkyl radicals having from 1 to 4 carbon atoms or aryl radicals, but with at least 80% of the radicals $R^1$ being methyl radicals, $R^2$ are $R^1$ and/or $R^3$ and/or $R^4$, with proviso that at least one radical $R^3$ is present per silicone-polyether copolymer molecule, $R^3$ is a polyether radical of the formula II $$-(Y)_e[O(C_2H_{4-d}R'_dO)_m(C_xH_{2x}O)_pZ]_w,$$

with the proviso that
e=0 or 1,
w=1 to 4,
d=1 to 3,
m≥1,
x=2 to 4 and
p≥1, and,

Y is a (w+1)-valent hydrocarbon radical which is optionally branched,

R' is selected from the group consisting of monovalent, aliphatic or aromatic hydrocarbons from $C_1$ to $C_8$, with the proviso that different radicals can also be combined with one another but at least one radical R' within the silicone-polyether copolymer molecule is an unsubstituted or substituted aromatic radical, Z is hydrogen or a monovalent organic radical, the sum m+p=3 to 100, $R^4$ is a polyether radical of the formula III $$-(F)_f[O(C_xH_{2x}O)_rZ]_g,$$

with the proviso that
f=0 or 1,
x=2 to 4,
g=1 to 4 and
r≥1,

F is a (g+1)-valent hydrocarbon radical which is optionally branched, a is from 1 to 100 when b is from 6 to 8,
a is from 1 to 200 when b is from 3 to 6,
a is from 1 to 300 when b is from 0 to 3,
b=0 to 8.

2. The method according to claim 1, where the additive comprises at least 60% of an organo functionally modified polysiloxane of formula I and up to 40% of a polyether.

3. The method according to claim 1, where the additive comprises at least 60% of an organo functionally modified polysiloxane of formula I and up to 40% of a polysiloxane-polyoxyalkylene block copolymer that does not contain aromatic radicals in the polyether blocks.

4. The method according to claim 1, wherein at least one R' radical is a phenyl radical.

\* \* \* \* \*